United States Patent [19]
Cunningham et al.

[11] Patent Number: 5,664,217
[45] Date of Patent: Sep. 2, 1997

[54] METHOD OF AVOIDING PHYSICAL I/O VIA CACHING WITH PRIORITIZED LRU MANAGEMENT

[75] Inventors: William Russell Cunningham; Michael Laurie Perry, both of Austin, Tex.

[73] Assignee: BMC Software, Inc., Houston, Tex.

[21] Appl. No.: 102,084

[22] Filed: Aug. 3, 1993

[51] Int. Cl.$^6$ ........................................ H01J 3/00
[52] U.S. Cl. ................ 395/821; 711/113; 711/207; 711/159; 711/160; 711/119; 711/122; 711/123; 711/203; 711/205; 711/206; 711/3; 711/133; 395/825; 395/826; 395/853; 395/872; 395/500
[58] Field of Search ........................ 395/500, 550, 395/460, 415, 417, 403, 440, 416, 486, 487, 446, 449, 450, 413, 825, 826, 853

[56] References Cited

U.S. PATENT DOCUMENTS

| | | | |
|---|---|---|---|
| 4,084,230 | 4/1978 | Matick | 395/405 |
| 4,476,526 | 10/1984 | Dodd | 395/440 |
| 5,210,865 | 5/1993 | Davis et al. | 395/575 |
| 5,226,143 | 7/1993 | Baird et al. | 395/425 |
| 5,396,614 | 3/1995 | Khalidi et al. | 395/425 |
| 5,493,668 | 2/1996 | Elko et al. | 395/457 |
| 5,513,336 | 4/1996 | Vishlizky et al. | 395/463 |

*Primary Examiner*—Jack B. Harvey
*Assistant Examiner*—Raymond N. Phan
*Attorney, Agent, or Firm*—Arnold, White & Durkee

[57] ABSTRACT

A method of caching I/O requests permits caching in the MVS environment independent of the access method protocol used to initiate an I/O request (e.g., QSAM, VSAM, Media Manager). In addition, objects can be user-prioritized for residence in the cache.

9 Claims, 12 Drawing Sheets

Microfiche Appendix Included
(7 Microfiche, 519 Pages)

Before XBM is installed

Media Management Vector Table (MMVT)

FIG. 5A

Before XBM is installed

Media Management Vector Table (MMVT)

Data Page Before
(on disk)
1101

FIG. 11A

Data Page in Cache
(compressed)
1111

FIG. 11B

Data Page supplied to
Application (expanded)
1113

FIG. 11C

METHOD OF AVOIDING PHYSICAL I/O VIA CACHING WITH PRIORITIZED LRU MANAGEMENT

1. BACKGROUND OF THE INVENTION

The invention relates to a process executed in a computer system to avoid physical input/output (I/O) by intercepting access-method requests for read and write to disk.

Microfiche appendixes, containing a total of 519 frames and 7 fiche 1, 2, and 3 set out copyrighted selected source code extracts and by a general use information concerning a commercial software package distributed by the assignee of this application which manifests the invention. Permission is granted to make copies of the appendixes solely in connection with the making of facsimile copies of this application in accordance with applicable law; all other rights are reserved, and all other reproduction, distribution, creation of derivative works based on the contents, public display, and public performance of the microfiche appendixes or any part thereof are prohibited by the copyright laws.

Figure 1:
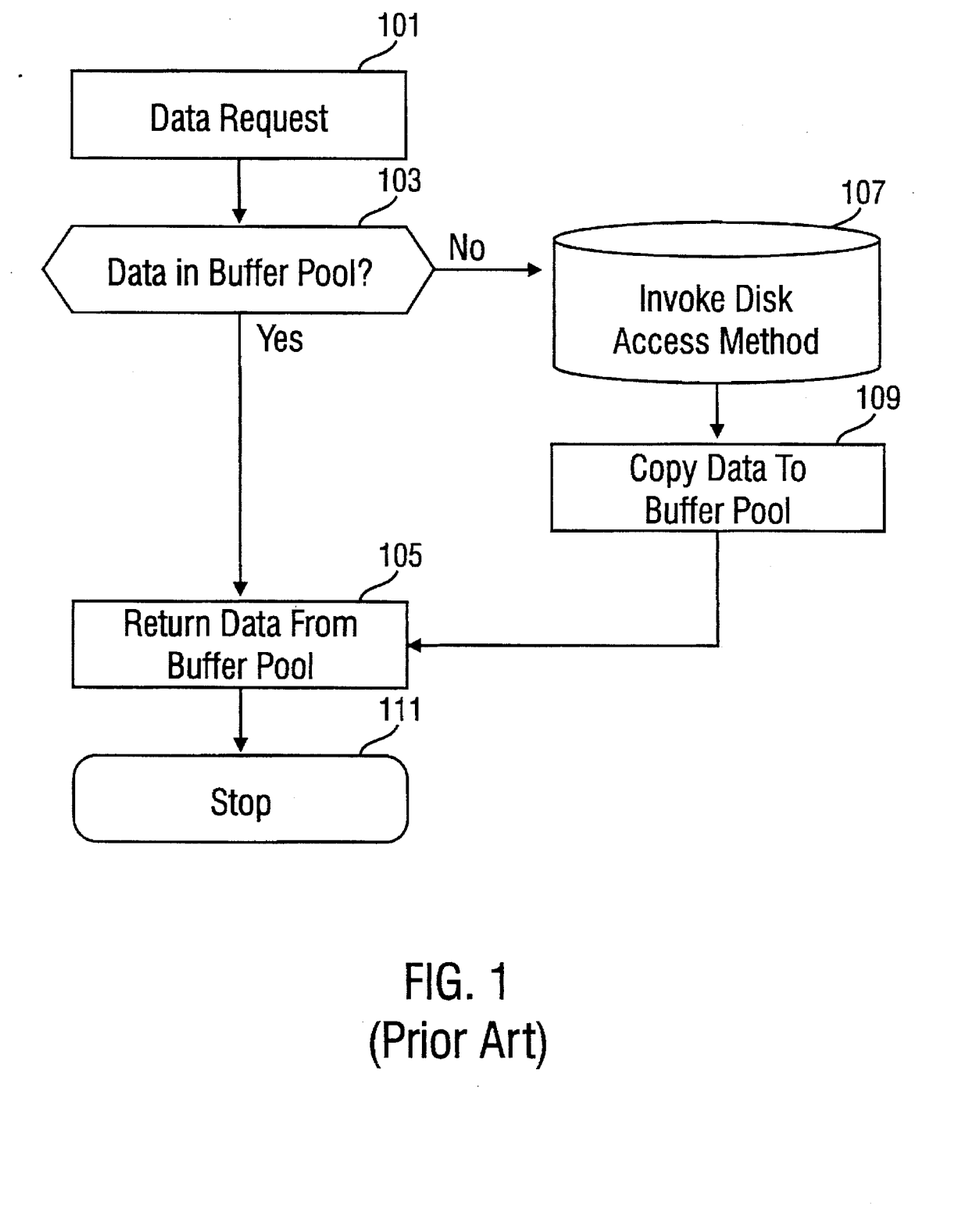
FIG. 1 is a block diagram showing a prior-art process by which requests for data are serviced.

Referring to FIG. 1, in the prior art, a user process (not shown) commonly issues a data access request, as shown at box 101. If the requested data is available in a buffer-pool memory area, as shown at box 103, the data is returned to the requesting process as shown at box 105 and execution of the data access request is terminated at box 111. On the other hand, if the data is not available in the buffer pool at box 103, a disk access method is invoked at box 107 to locate and retrieve the data from disk; commonly, the data will be copied from disk storage to a buffer pool as shown at box 109 and the data will be returned to the requesting process.

2. SUMMARY OF THE INVENTION

A method, referred to herein as the Extended Buffer Manager (XBM), in accordance with the invention is implemented via a computer program to provide enhanced I/O performance for MVS applications.

Physical I/O (e.g., disk access) is generally the most time consuming operation of any application. Reducing the number of I/O operations performed, therefore, translates into a reduction in CPU usage and thus, to improved application performance. XBM provides buffer management capabilities above those of standard MVS I/O access methods. Advantageously, this extended buffer management method provides a reduction in physical I/O operations when reading and/or writing data. XBM runs as a standard MVS subsystem. It creates and manages an extended buffer. This extended buffer is a collection of caches and associated data structures.

During operation, XBM intercepts memory I/O requests issued by "monitored" applications. It then checks to see if the requested data is within one of its caches and, if so, returns the data to the calling application. Anytime this is accomplished a physical I/O operation has been eliminated. If the requested data is not in an XBM cache, XBM uses standard MVS access methods to retrieve the data and store it in its cache. A novel two-level Least-Recently-Used (LRU) algorithm is used to update XBM caches.

4. DETAILED DESCRIPTION OF SPECIFIC EMBODIMENTS

One illustrative embodiment of a method in accordance with the invention is described below as it might be implemented in a computer program (referred to here for convenience as "XBM"). An actual implementation of such a program might be executable on, e.g., an IBM System 370-compatible machine or equivalent running IBM OS/VS SP2 (MVS/XA), SP3 or SP4 (MVS/ESA), or on one or more other suitable computer systems.

For purposes of further illustration, Appendix 1 (a 172-page assembly language listing with the legend "XBM2RDWR" at the top of each page) sets out selected extracts of source code from an actual software package owned and distributed under license by the assignee.

Appendix 2 (a 325-page copy of two documents entitled "Extended Buffer Manager for DB2 General Information" and "Extended Buffer Manager for DB2 Reference Manual" bearing their own respective page numbers as well as a single sequence of page numbers CP0000001 through CP0000325) sets out detailed information about the user interface of the actual software package.

Appendix 3 (a 9-page assembly language listing) sets out selected extracts of source code from the actual software package for performing the compression routines discussed below.

In the interest of clarity, not all features of an actual implementation are described in this specification. It will of course be appreciated that in the development of any such actual implementation (as in any software development project), numerous programming decisions must be made to achieve the developers' specific goals and subgoals (e.g., compliance with system- and business-related constraints), which will vary from one implementation to another. Moreover, attention will necessarily be paid to, e.g., proper serialization to handle concurrent events. It will be appreciated that such a development effort might be complex and time-consuming, but would nevertheless be a routine undertaking of Multiple Virtual Storage (MVS) system program development for those of ordinary skill having the benefit of this disclosure.

Figure 2:
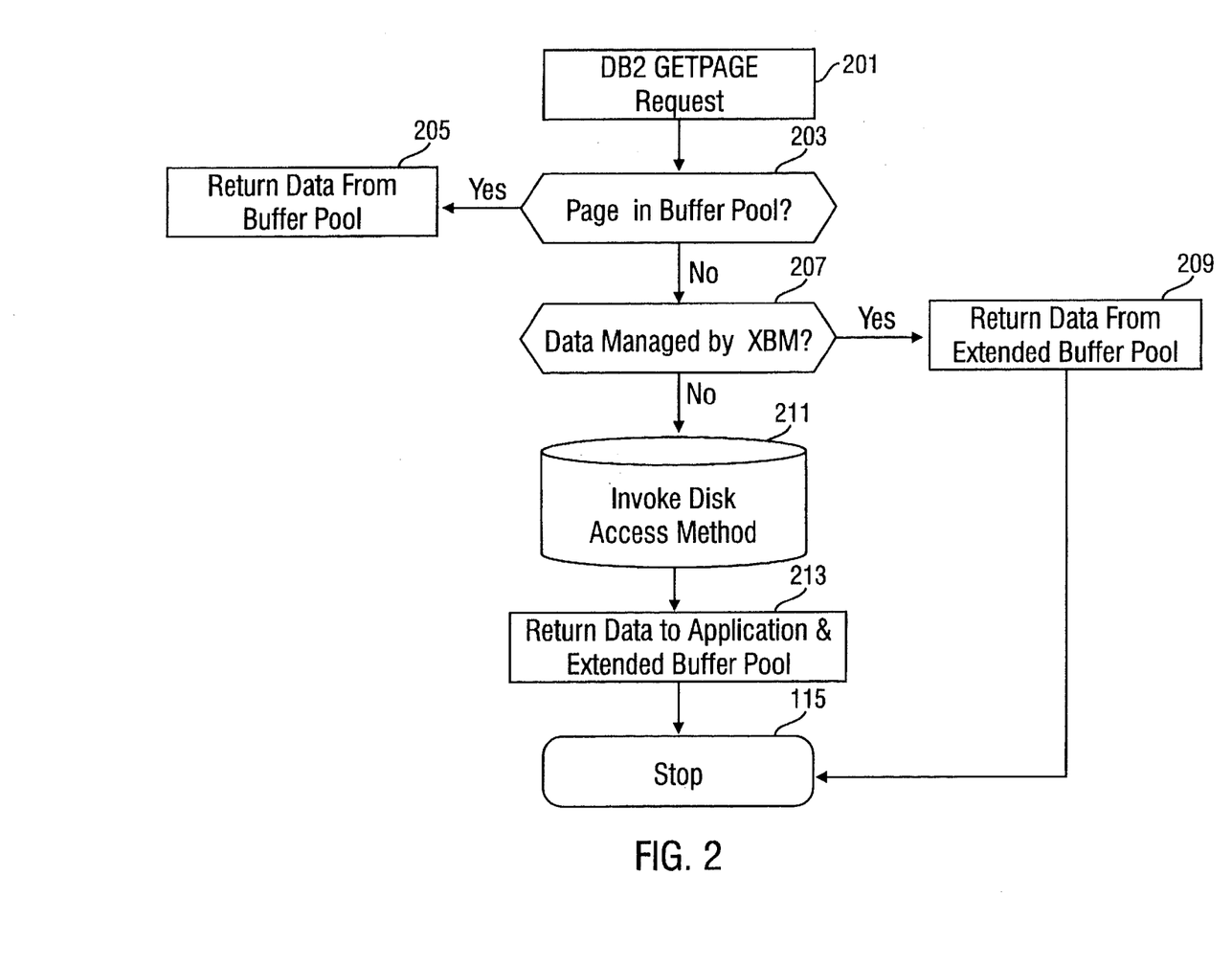
FIG. 2 is a block diagram of a method of servicing data requests in accordance with the invention.

As shown in FIG. 2, a method in accordance with the invention improves upon the prior-art process shown in FIG. 1. As shown at box 201 for an illustrative system involving the well-known IBM DB2 system, a user process (e.g., a DB2 installation executing a particular user job), issues a GETPAGE request for data as shown in box 201. If the requested data is available in a buffer pool, as shown at box 203, the data is returned to the requesting process from the buffer pool. On the other hand, if the data is not available in the buffer pool, a series of additional steps is executed by a management process, shown in figures as XBM, before performing a disk access. If the data in question is being managed by the XBM process, as shown at box 207, the requested data is retrieved by XBM from an extended buffer in system memory shown at box 209 and returned to the requesting process. Otherwise, the requested data is retrieved from disk storage, shown in boxes 211 and 213.

Figure 3:
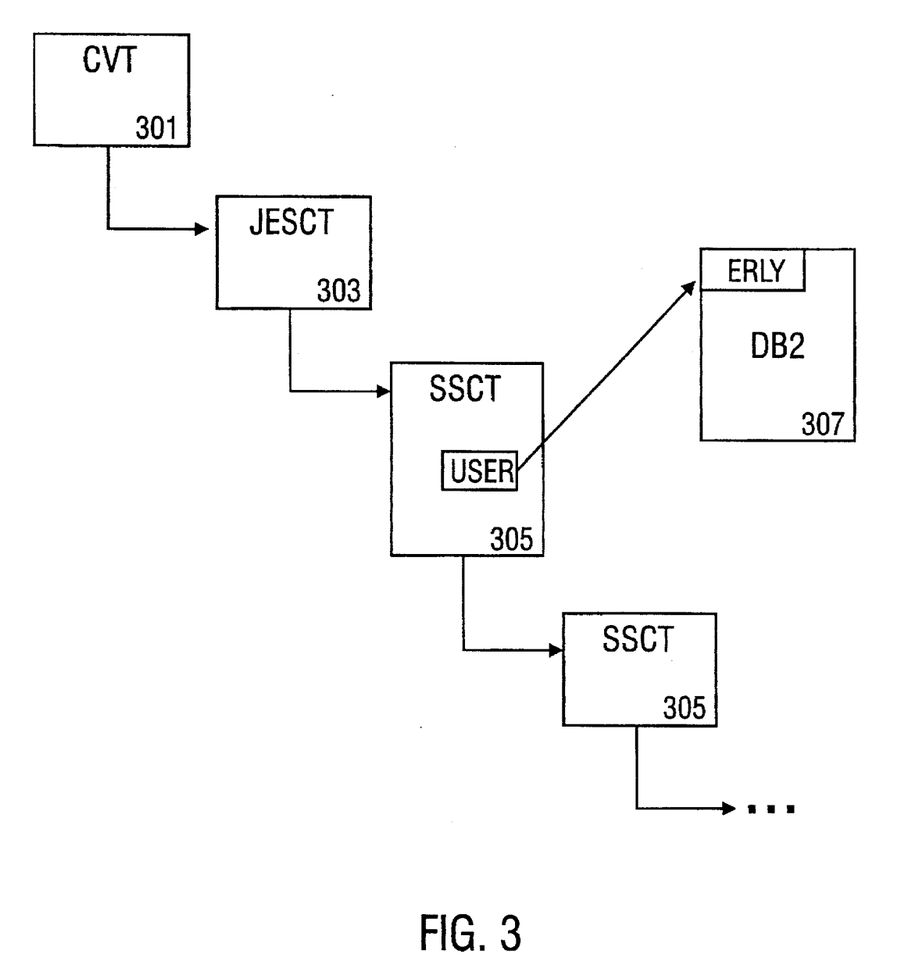
FIG. 3 is a block diagram of various control blocks in an IBM DB2 system that are used in conjunction with the method.

Referring to FIG. 3, upon installation of the XBM system (e.g., as an MVS subsystem), the first task approached by XBM is to build a table of other subsystems or other programs for which XBM will manage data requests. The XBM installation routine scans the subsystem communications table (SSCT) control blocks, shown as SSCT in box 305. XBM checks the pointer value stored in the user field of the SSCT; this pointer provides the address of a subsystem control block which identifies the subsystem in an "eye catcher" field, shown as a DB2 subsystem 307 having an eye catcher ERLY. Alternatively, of course, XBM could determine "on the fly," on a real-time basis, whether the data request in question was issued by a subsystem that is being managed by XBM, but that of course would entail additional overhead.

In initializing itself, XBM builds an "object-oriented" representation of the other subsystems for which it is managing data requests. Object-oriented programming is well-known in the software industry; familiarity with the basic concepts thereof is assumed.

Figure 4:
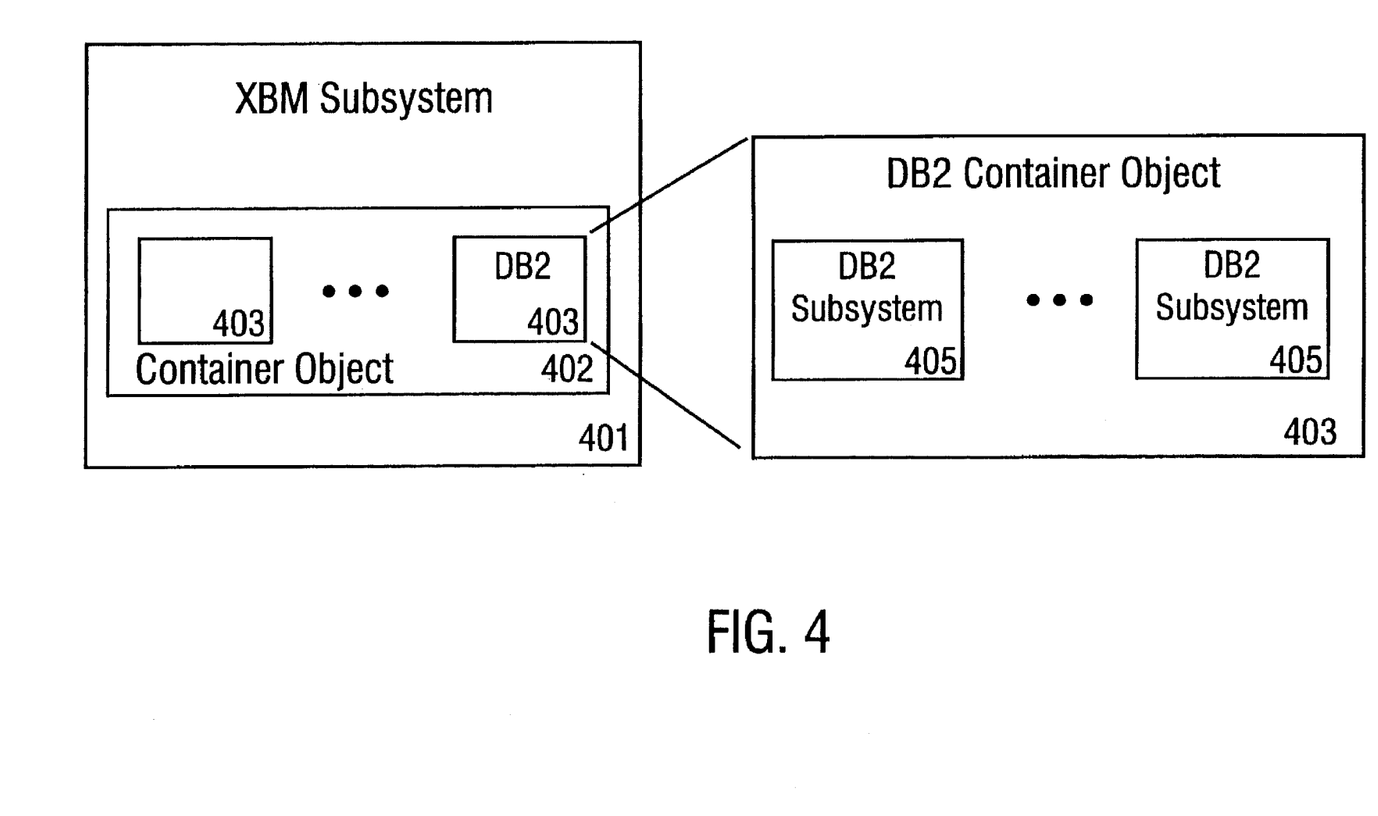
FIG. 4 is a block diagram of a data structure used in conjunction with the method.

The object-oriented representation referred to above can be understood with reference to FIG. 4. The XBM subsystem 401 includes storage allocated as a container object 402. The container object includes one or more pointers 403 pointing respectively to members of the respective component classes. As illustrated in FIG. 4, one such component class is a DB2 component; this component itself includes pointers to memory in which is stored representations of respective DB2 subsystems 405. An exemplar specification for a representation of a DB2 subsystem 405 is set forth in the source-code appendix 1.

XBM makes use of a class of objects known as a "bag," which is a class that describes a hashed container. Wherever practicable, a bag container is used for access performance. For example, the component container 402 is a bag. The hash algorithm used will depend on the objects that are contained within the container. In other words, each object that is placed into a container has its own methods for hashing itself to optimize its own performance. As illustrated in the source code appendix 1, in the case of a DB2 subsystem the hash algorithm may include obtaining the first four letters of the DB2 subsystem and dividing by the size of the hash table. The remainder resulting from that computation becomes the hash value for a lookup into the hash table.

Figure 5A:
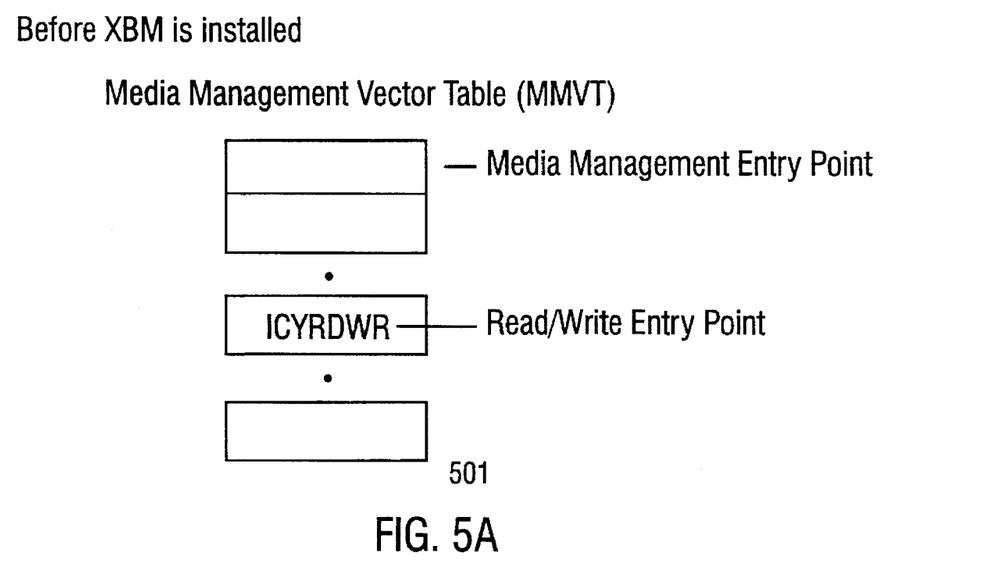
FIGS. 5a and 5b are "before" and "after" diagrams of specific entries in a media management vector table (MMVT) when an illustrative computer program implementing the method is installed.
Figure 5B:
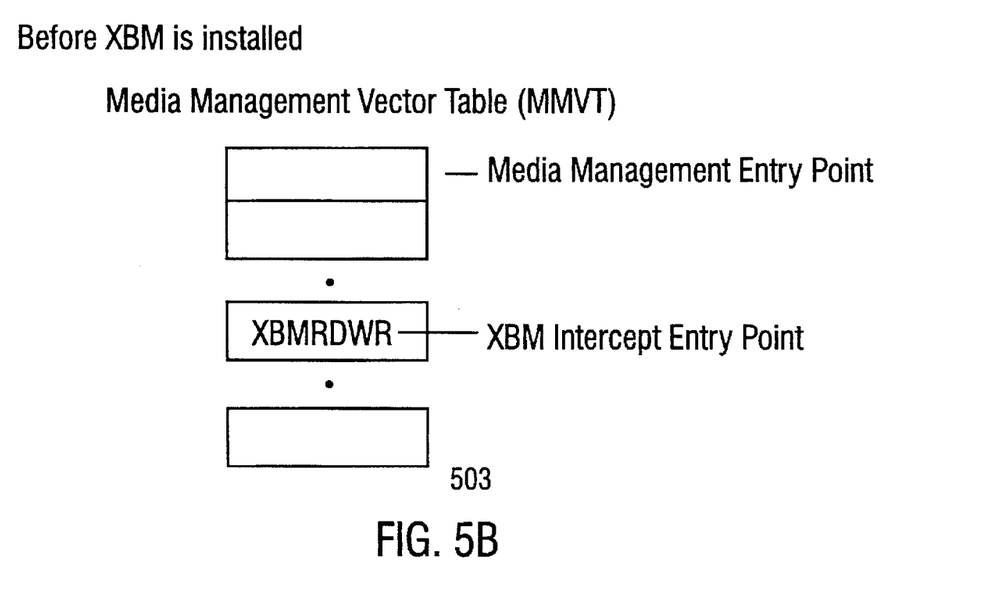

Use of the method entails utilizing an example of the well-known "hooking" technique to intercept read/write service calls issued by, e.g., application programs naming under the MVS operating system. Referring to FIG. 5, a before-and-after illustration of the Media Manager Vector Table MMVT maintained by MVS is shown. As is well known to those of ordinary skill and documented in several IBM publications such as the Media Manager Diagnosis Guide, the MMVT is a table that includes vectors to addresses of specific locations in memory; the respective addresses are for various series of instructions for performing specified services. For example, referring to box 501 (a "before" illustration of the MMVT), a table entry ICYRDWR is shown. This table entry contains the address in storage of a series of instructions for performing the standard MVS read/write service. After the XBM program is installed in the system by a user such as a system administrator, the MMVT vector table is overridden at the ICYRDWR table entry with the address of XBM's own instructions for performing the read/write service (actually, for performing front-end processing for that service), as shown at box 503.

Figure 6:
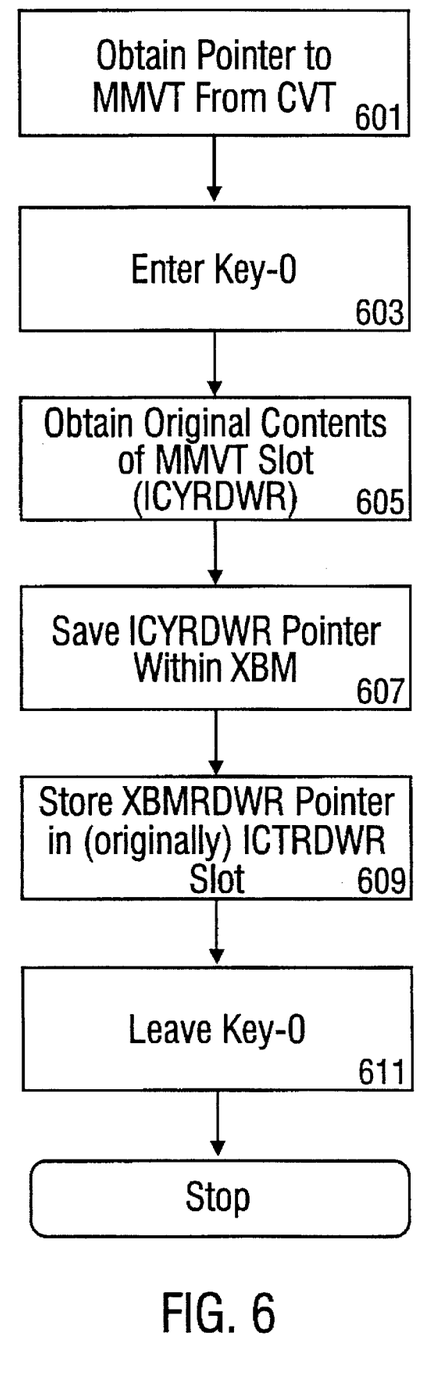
FIG. 6 is a flow chart showing a process by which the MMVT is overwritten during installation of the illustrative computer program.

The process by which the MMVT is overwritten as described in the previous paragraph is illustrated in FIG. 6, which describes the process of actually hooking the XBM process into the operating system at box 601. A pointer to the MMVT is obtained from the communications vector table (CVT) maintained by the MVS operating system. At box 603, the XBM process obtains "Key 0" authorization. As well-known to those of ordinary skill and extensively documented in various IBM publications, Key 0 is a user authorization level that permits a process to have essentially unlimited access to system resources. At box 605, XBM obtains the original contents of the vector table MMVT at the ICYRDWR slot. At box 607, XBM saves the original contents of the vector table into its own storage such that it can use that address to continue the original process as necessary. At box 609, XBM stores the pointer to itself into the MMVT at the ICYRDWR slot. This allows XBM to intercept all requests to the media manager for read/write access. At box 611, XBM leaves Key 0 privilege mode.

(The XBM process preferably does not restore the original table entry for the ICYRDWR slot in the vector table MMVT. Rather, XBM simply disables its own preprocessing and, upon the occurrence of a data access request, simply passes control essentially immediately to the original address pointed to in that slot. As known to those of ordinary skill, restoring the original address directly to the MMVT slot could have unanticipatable consequences, perhaps including crashing the system.)

Figure 7A:
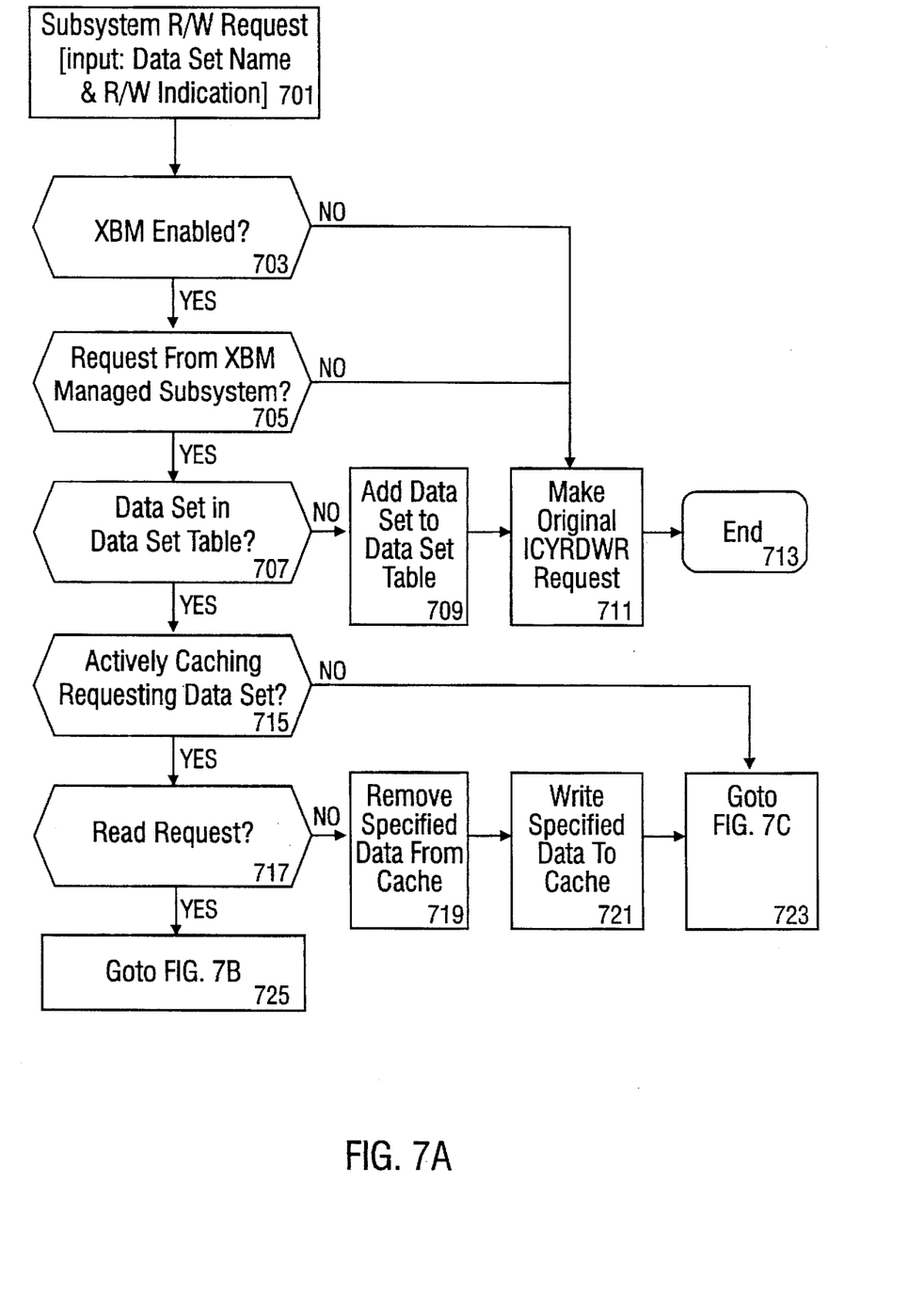
FIGS. 7a through 7c, collectively, are a flow chart showing a method of processing a data request in accordance with the invention.

FIG. 7a depicts the method steps performed in preprocessing a data request from a calling process such as an application process (sometimes referred to below as a "caller"). At box 701, the XBM subsystem receives a read/write request. At box 703, a test is made to determine whether XBM is enabled; if not, the original routine ICYRDWR is invoked at box 711.

At box 705, a test is made to determine whether the data request is from a sub-system being managed by XBM. If not, the original routine ICYRDWR is invoked at box 711 as noted above.

In box 707, a test is made whether the data set is in the data set table 901 maintained by XBM (discussed in more detail below with reference to FIG. 9). If the data set is not already in the data set table 901, at box 709 the data set is added to table 901 and the original ICYRDWR routine (described below as a "media manager" routine) is invoked at box 711 as described above.

At box 715, a test is made whether or not the data set is actively being cached by XBM. A user such as a system administrator may activate a data set for XBM caching using the controls provided by XBM (explained in detail in Appendix 2). If the data set is not being actively cached, then XBM issues the appropriate media manager request as shown in FIG. 7c and returns the resulting data to the caller. This is done in order to capture the performance statistics both before and after the request is serviced by the media manager itself.

As shown in FIG. 7c, at box 747 the media manager interface block (documented in the aforementioned IBM publications) is modified so that the media manager returns control to XBM after completion of the I/O request processing. At box 749, the original ICYRDWR routine is invoked, resulting in asynchronous processing as shown in boxes 755 through 763. At box 757, if the current request is a read type request, then the data that was read from the disk is added to the cache at box 759. At box 761, the calling process is notified of I/O completion.

On the other hand, if the data set is indeed being actively cached by XBM, then at box 717 a test is made for whether the current request is a read-type request. If not, then at box 719 all of the blocks requested are removed from the XBM extended buffer, or data cache, described in more detail below with reference to FIG. 8. This is done to avoid any duplicate data in the cache. The data to be written to the disk is then added to the extended buffer at box 721. When this is complete the process branches to perform the steps shown in FIG. 7c and described above.

It will be apparent from FIG. 70 that the media-manager request issued as shown in box 749 differs from the request as issued at box 711 in FIG. 7a, in that the former is a call and the latter is a branch. In other words, control returns to XBM after the media manager request has been launched at box 749 in FIG. 7c; in contrast, when the request is launched at box 711 of FIG. 7a, control does not return to XBM.

Figure 7B:
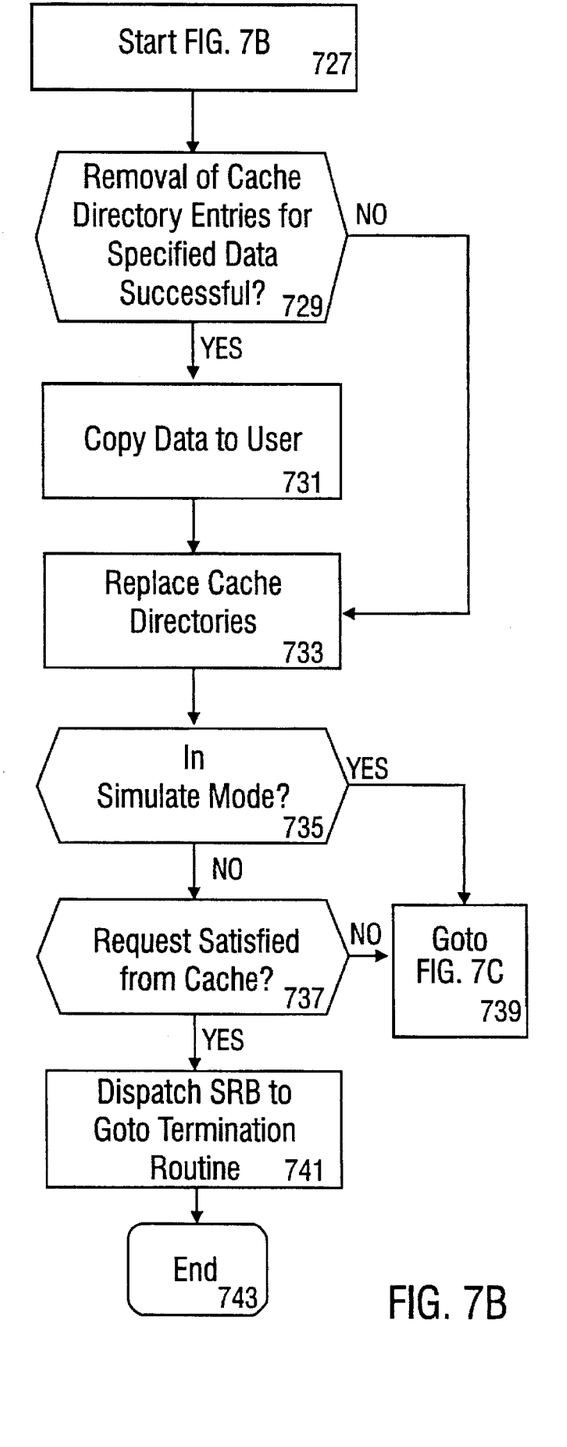
Figure 7C:
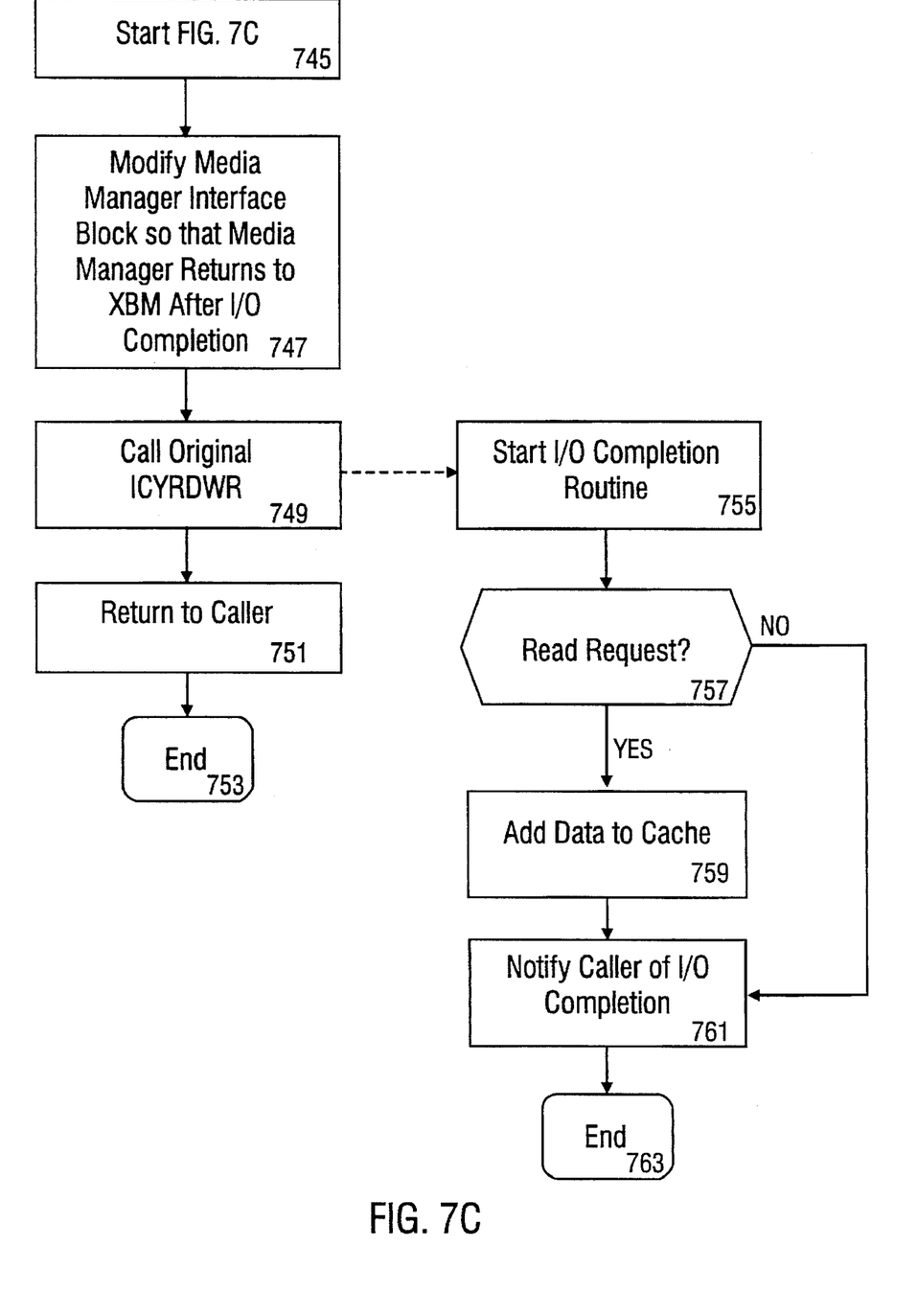

Referring again to box 717 in FIG. 7a and to FIG. 7b, if the media manager request is a read-type request, then at box 729, XBM attempts to remove all of the requested blocks from the cache directory (as opposed to from the cache itself). This is done to prevent changes from being made to the cache for those particular data blocks (e.g., "pages" in DB2) while they are being read.

If at box 729 the removal of all of the requested blocks was successful, then the requested data is copied from the cache to the caller's buffers in a simulated input of data from disk at box 731. It will be apparent to those of ordinary skill that the data came from the cache instead of disk in this case. Assuming that this was successful (but even if it was not successful), box 733 reverses the process of box 729: XBM puts the directory entries for the blocks back into the cache directory so that they may be accessed again by another caller.

If XBM was unsuccessful in removing all of the requested blocks from the cache directory at box 729, then the data copying step at box 731 is skipped. This would occur, for example, in the event of a sequential prefetch request in which multiple blocks were requested but some of the blocks were not in the cache.

At box 735, a test is made to see if XBM is in simulate mode. If so, a branch is made to the steps shown in FIG. 7c as discussed above. This causes XBM in simulate mode always to go to the media manager to satisfy the input or output request rather than satisfying the request from the cache. Simulate mode is designed to show the user of XBM exactly what to expect in the event that simulate mode were to be turned off or if the user were to select non-simulate mode. The statistics gathered are actual statistics for XBM performance, but XBM is not actually satisfying the request from the cache. Simulate mode may be thought of as a safety valve, a preliminary test while the user (e.g., the system administrator) becomes comfortable with the idea of caching.

At box 737, a test is performed whether XBM has been successful at satisfying the input request from the cache. If so, then at box 741 XBM dispatches an SRB (service request block, a well-known method of requesting that MVS schedule a unit of work) whose purpose is to branch to the original caller's termination routine. Once the SRB is dispatched, XBM returns to the caller at box 743 indicating to the caller that the input request has been started successfully. Otherwise, control is passed to the steps shown in FIG. 7c as discussed above.

Figure 8:
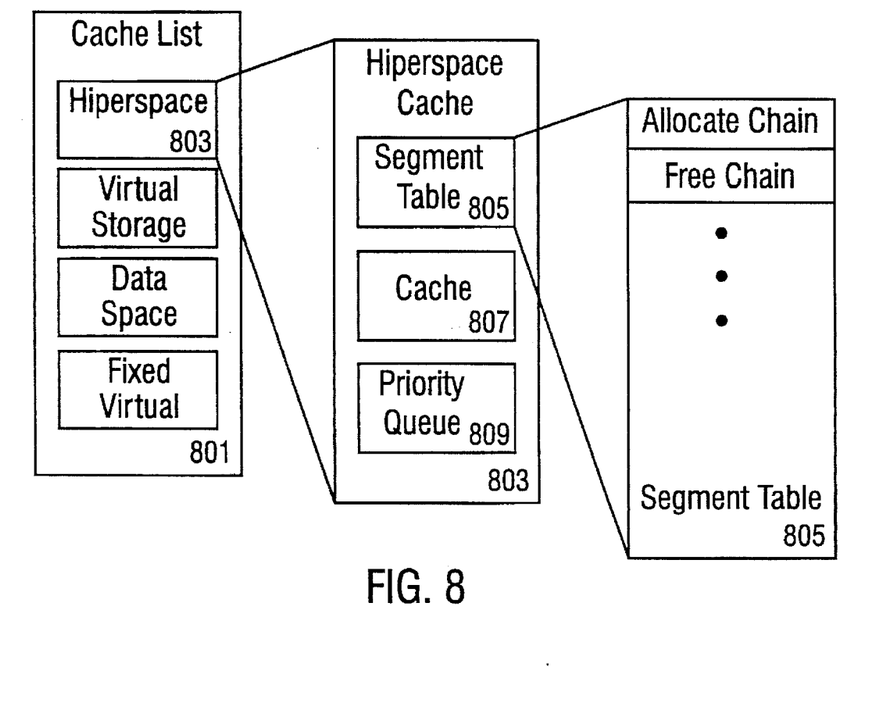
FIG. 8 depicts some of the control blocks used by the illustrative computer program to allocate space in the extended buffer.

FIG. 8 depicts some of the control blocks used by XBM to allocate space in the extended buffer referred to at box 213. Box 801 depicts a container object called the cache list, containing control blocks that describe the four possible types of cache managed by the illustrative implementation. These are hiperspace cache, the virtual storage cache, a dataspace cache, and a fixed virtual storage cache. The cache list 801 is an extendable list of pointers to other memory addresses; while the cache list 801 shown in FIG. 8 includes four such pointers such as box 803, it will be apparent to those of ordinary skill having the benefit of this disclosure that a larger number may readily be included.

Referring to box 803, a cache object includes three elements that are used in the management of that particular cache. The first element is a segment table box 805 (more precisely, a pointer to the segment table block). The cache object also contains a pointer to the cache 807 itself (or in the case of a hiperspace cache, a pointer to a control block that describes the cache 807, because the hiperspace cache does not exist in real memory but in expanded memory). Box 809 is a priority queue (actually a pointer to a priority queue) which keeps track of the best data set from which to "steal" in the event that the cache is full and a page or block in the cache needs to be replaced by a newer block.

Referring in particular to box 805, the segment table includes a number of four-byte pointers, with one pointer per cache segment. A segment is a slice, i.e., a 1,024-byte portion, of the cache. Slicing the cache helps gain the benefits of compression as described below. In the case of a hiperspace cache, the unit of data exchange between hiperspace and real memory is 4,096 bytes. One cannot move any less than 4,096 bytes. Therefore, to gain the benefits of compression, XBM divides a 4,096 byte cache frame into four parts. Each part is known as a segment. The segment table includes one free chain which describes the segments which are not currently in use in the cache. The segment table also contains a chain of segments for each block that is allocated to a data set in the cache.

Figure 9:
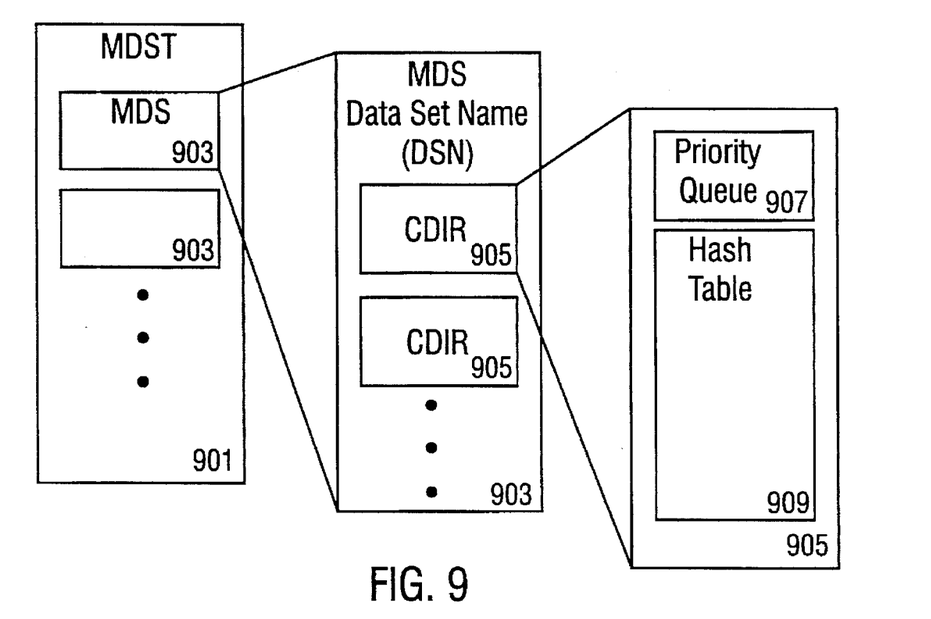
FIG. 9 is a block diagram of a managed data set table and related data structures.

Referring to FIG. 9, the XBM Media Manager Intercept uses the managed data set table (MDST) 901 which is a set of managed data sets to quickly look up the corresponding managed data set in the table. If the media-manager request data set is not currently in the table, then a new entry is made in the table. The contents of a managed data set are the data set name which is used to compute the hash value for the managed data set and (in the illustrative implementation) up to four cache directories, although there is no actual limit to the number of cache directories that can be used by ("owned by") a managed data set.

The cache directory (CDIR) 905 describes the blocks that are allocated to a particular cache for that data set. A cache directory contains two sub-boxs 907 and 909. Box 907 is a priority queue which maintains the time order that the blocks were entered into the cache for the data set in question. As is well-known to those of ordinary skill and as shown in the source code in Appendix 1, the priority queue may be used to discover the oldest block quickly. As shown in detail in Appendix 2, a user may selectively control the priority of particular data sets or other objects for residence in the cache.

The other box in the cache directory, box 909, is a hash table that contains a pointer to the cache segment table 805 for each data block that the data set has allocated in the cache. The hash table also contains a time stamp for that block and a key for the data block; in this implementation the key is the relative byte address of the block in question.

Figure 10:
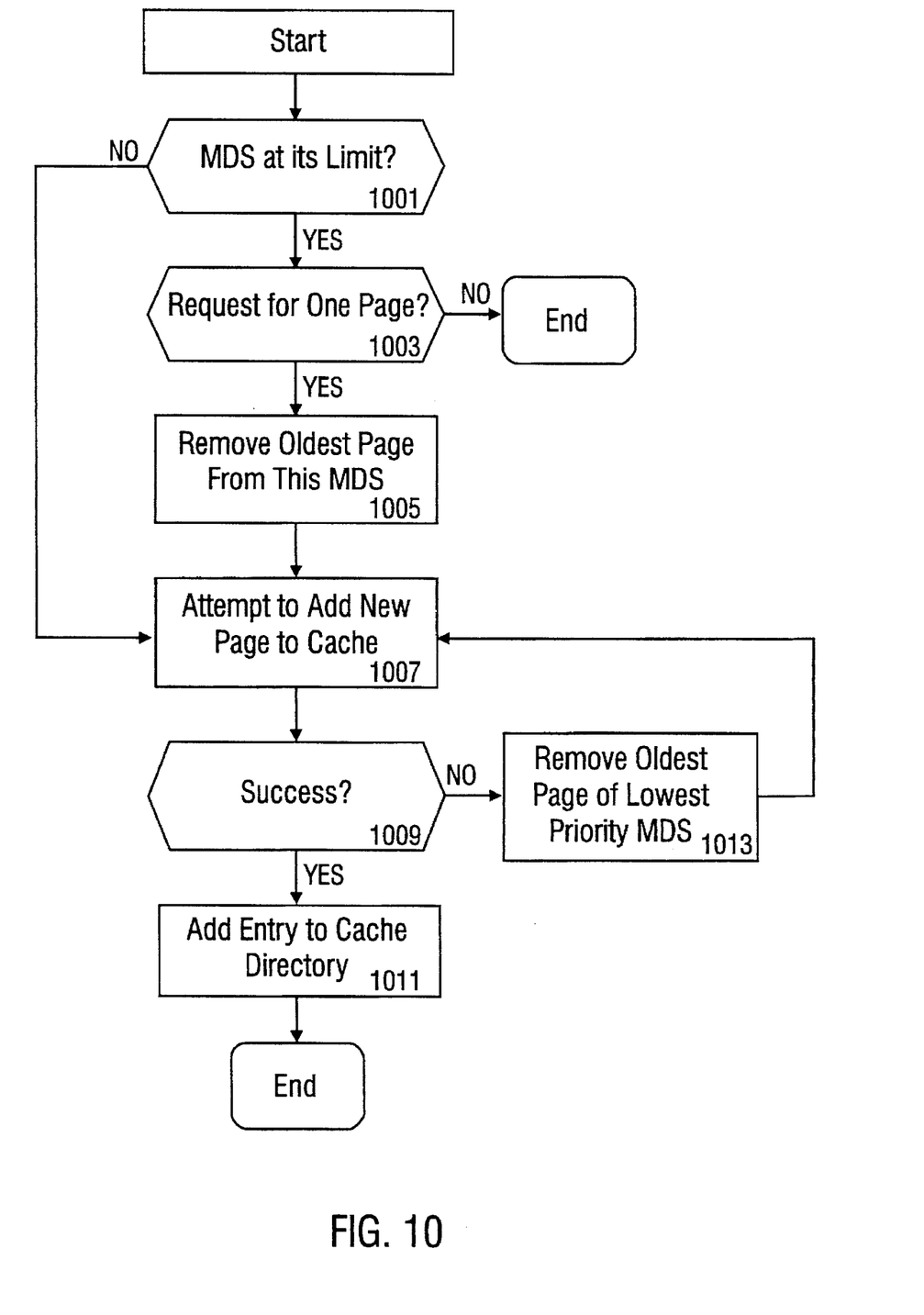
FIG. 10 is a flow chart illustrating a cache replacement strategy used by the illustrative computer program.

FIG. 10 describes the cache replacement strategy that XBM uses, cache replacement being the concept of discovering which is the best data block in the cache to remove in order to place a newer, better data block into the cache. The term "data block" is used instead of the more conventional "page" because the latter term is associated with DB2 specifically.

To begin the algorithm at box 1001 a test is made as to whether the managed data set (MDS) being processed by XBM has reached the limit of the number of bytes it is allowed to have in the cache. This limit is set by the user using the controls provided by XBM. If the data set is at its limit, XBM wishes to remove the block that is owned by this data set that is the oldest. However, at box 1003, a test is made to determine whether the current request is a request for one page only. The purpose of this test is to prevent multiple page requests from flushing the cache. It was determined empirically that in some cases a data set's pages would be replaced just before the time they were needed to be used again. The cache hit ratio was zero in that event. This test at box 1003 causes the cache to contain its limit worth of blocks in spite of the fact that all the requests for the data are multi-page requests.

If the request is for one block only, then XBM removes the oldest block from this data set's cache. If the request is for multiple blocks, then the current new block going into the cache is not placed in the cache. Replacement of the older blocks is avoided in that case. Removing the oldest blocks from the managed data set is box 1005. If the managed data set was not at its limit, then a branch is made to box 1007 where XBM attempts to add a new block to the cache. If at box 1009 the attempt to add the block to the cache is successful, then the cache directory is updated with the new entry at box 1011. If the attempt to add the block to the cache is unsuccessful because the cache is full, then box 1013 describes the process to remove the oldest box of the lowest priority data set.

Once the oldest block of the lowest priority data set has been removed, a looping branch is made to 1007, and a new attempt to add the block to the cache is made.

Figure 11A:
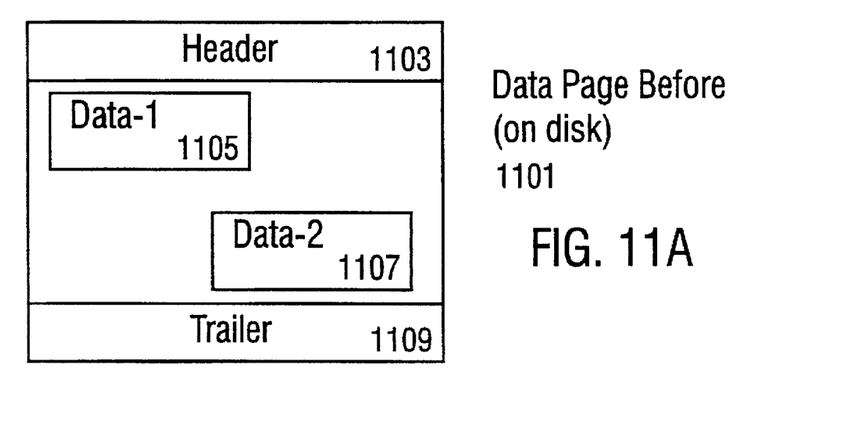
FIGS. 11a through 11c are block diagrams illustrating data compression and decompression as implemented by the illustrative computer program.
Figure 11B:
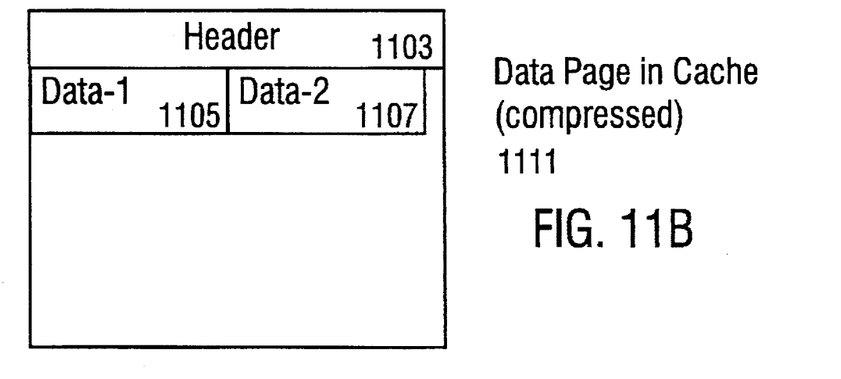
Figure 11C:
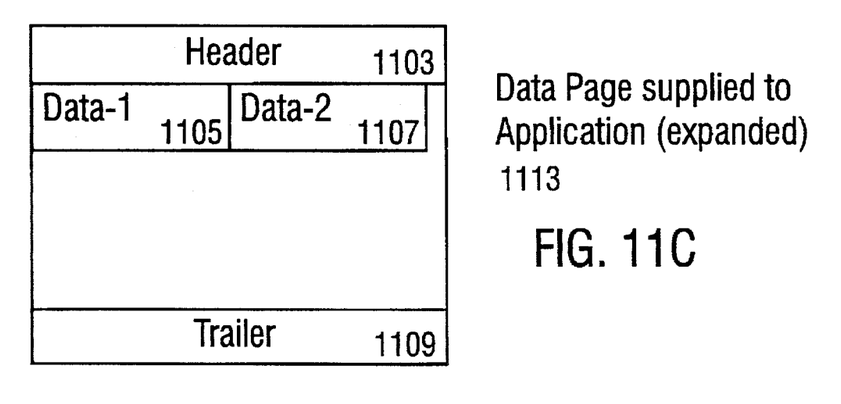

FIG. 11 diagrams the compression and extension algorithms used by XBM in reference to DB2 data page specifically. Selected assembly language source code for this process is given in appendix 3. Compression is implemented and available to the user to provide several potential benefits. Compression allows more data pages to fit into a specific amount of cache than could fit if it were not compressed. Also, a side benefit of this process is that DB2 receives a free space reorganized page which improves performance for subsequent DB2 row updates.

Box 1101 depicts a DB2 data page and how it would look after some typical update use in that it contains the header box 1103 that describes the page, it contains a trailer at the end of the page box 1109 that describes where each row of data is on that page and, in this example, two rows of data blocks 1105 and 1107 which are interspersed in the page with various free space holes surrounding them. Box 1111 depicts what the page would look like while being held in the XBM cache after it was compressed. The header 1103 exists at the beginning of the page as before. The two data rows 1105 and 1107 have been moved to follow right behind the header which basically eliminates the rest of the page which is how XBM performs the compression. In this case it will take less space than it had originally. When the page is subsequently returned to DB2 to satisfy the request, the page is reformatted so that DB2 knows how to work with it and has been optimized for the free space as mentioned earlier. Box 1113 depicts what this page would look like. The header, box 1103, is again at the beginning of the page. The two data rows 1105 and 1107 follow immediately after the header. The remainder of the page to the trailer box 1109 that always resides at the end of the page has become DB2 free space and can be used for adding future data at a later time.

It will be noted that the XBM free space compression algorithm works in conjunction with the standard DB2 compression procedure of using the DB2 edit procedure for row level compression. It does not preclude the use of that procedure nor require the use of it, but enhances that procedure also.

A significant advantage of the method is that it permits caching in the MVS environment independent of the access method protocol used to initiate an I/O request (e.g., QSAM, VSAM, Media Manager). In addition, objects can be user-prioritized for residence in the cache.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application.

What is claimed is:

1. A method, executed by an extended buffer manager (XBM) process executing in an MVS computer system having a data storage system, of improving the processing of an input/output (I/O) request initiated by a calling process, comprising:
if said calling process is an XBM managed process then
if a data set corresponding to said calling process is in a XBM data set table then if said XBM process is actively caching a data set requested by said calling process then
if said I/O request is a read request then
if said XBM process is successful in removing cache directory entries
associated with said data set then
copy data associated with said data set to said calling process; and replace said cache directory entries;
else
continue;
if said XBM process is in simulate mode then execute a MVS media manager routine and terminate;
else if said read request is satisfied from a cache then dispatch a service request block to said calling process; and return execution control to said calling process;

```
            else
                execute a MVS media manager routine and ter-
                    minate;
        else
            remove data specified by said calling process from a
                XBM data cache;
            write specified data to a XBM data cache; and
            execute a MVS media manager routine and termi-
                nate;
    else
        execute a MVS media manager routine and termi-
            nate;
else
    add a data set corresponding to said calling process to
        said XBM data set table; issue a MVS I/O request for
        said calling process; and terminate;
else
    terminate.
```

2. The method of claim 1, wherein a request to add data to a XBM data cache structure and its associated managed data set (MDS) structure and data cache directory (CDIR) structure, said method comprising:
```
if said MDS structure is at a predefined size limit, then
    if said request is for one page, then
        removing from said XBM processes data cache struc-
            ture the data associated with its oldest page;
    else
        terminate;
else
    continue;
if said XBM process is unsuccessful in adding a new page
    to said XBM data cache structure then
    repeatably removing from said XBM data cache structure
        the data associated with its oldest page until said XBM
        process is successful in adding a new page to said XBM
        data cache structure;
else
    add entry to said XBM processes XBM data cache
        structure and associated MDS structure and CDIR
        structure; and
    terminate.
```

3. The method of claim 1, wherein said MVS media manager routine comprises:
```
modifying a MVS media manager interface block such that,
    upon completion of a MVS media manager routine,
    control is returned to said XBM process;
issuing a MVS I/O request for said calling process;
returning control to said calling process;
on notification of said MVS I/O request completion;
    if said I/O request was a read request then
        adding returned data to a XBM data cache;
    else
        continue; and
notifying said calling process of I/O request completion.
```

4. A method of processing a read request in an MVS computer system having a data storage system and a media manager vector table, said media manager vector table having an entry, referred to as a read/write table entry, containing an address of a series of instructions for performing a read/write service, referred to as a read/write routine, said read request being generated by a calling process requesting that control be passed to the read/write routine to copy data from a specified data set on a storage medium to a buffer, referred to as a calling process buffer, said method being executed by a process in the computer system, referred to as a manager process, and comprising:

(a) providing, in the read/write table entry, an address comprising the address of a processing routine of the manager process in place of the address of the read/write routine, (b) providing, in a storage device in the computer system:
   (1) a data structure containing information about one or more data sets being managed by the manager process, referred to as a data set table, and
   (2) a directory containing one or more entries respectively corresponding to data blocks in the data sets being managed by the manager process, and
   (3) a cache containing copies of the data blocks having entries in the directory;

(c) receiving the read request in response to the calling process's request that control be passed to the read/write routine;

(d) testing whether some or all of the following conditions are true:
   (1) the calling process is being managed by the manager process,
   (2) the specified data set is listed in the data set table, and
   (3) the specified data set is being actively cached by the manager process;

(e) if all of the conditions recited in paragraph (d) are true, then:
   (1) removing, from the directory of data blocks, one or more entries respectively corresponding to one or more data blocks responsive to the read request, referred to as the requested data blocks;
   (2) attempting to copy the requested data blocks from the cache to the calling process buffer;
   (3) replacing the data entries for the requested data blocks in the directory of data blocks;
   (4) if (A) the manager process is in a simulate mode, or (B) the attempt to copy the requested data blocks from the cache to the calling process buffer was not successful, then (x) passing control to the read/write routine to copy the requested data blocks from the storage medium to the calling process buffer, (y) when the read/write routine reports that the copying is complete, copying the requested data blocks to the cache, and (z) notifying the calling process that the processing of the read request is complete;
   (5) if (A) the manager process is not in a simulate mode and (B) the attempt to copy the requested data blocks from the cache to the calling process was successful, then (x) dispatching a service request block to branch to a termination routine of the calling process and (y) returning control to the calling process.

5. The method of claim 4, wherein the read/write routine is the MVS routine identified in an MVS media management vector table by the designation ICYRDWR.

6. The method of claim 4, wherein the manager process maintains an object-oriented data structure containing information about one or more calling processes.

7. The method of claim 6, wherein the object-oriented data structure is a bag.

8. A method of processing a write request in an MVS computer system having a data storage system and a media manager vector table, said media manager vector table having an entry, referred to as a read/write table entry, containing an address of a series of instructions for performing a read/write service, referred to as a read/write routine, said I/O request being generated by a calling process requesting that control be passed to the read/write routine either (x) to copy data, from a specified data set on a storage medium in the computer system, into a buffer, referred to as a calling process buffer, such a request being referred to as a read request, or (y) to copy data from the calling process buffer to the storage medium, such a request being referred to as a write request;

said method being executed by a process in the computer system, referred to as a manager process, and comprising:

(a) providing, in the read/write table entry, an address comprising the address of a processing routine of the manager process in place of the address of the read/write routine, (b) providing, in a storage device in the computer system:
  (1) a list of data sets being managed by the manager process,
  (2) a directory containing one or more entries respectively corresponding to data blocks in the data sets being managed by the manager process, and
  (3) a cache containing copies of the data blocks having entries in the directory;

(c) receiving the I/O request in response to the calling process's request that control be passed to the read/write routine;

(d) testing whether some or all of the following conditions are true:
  (1) the calling process is being managed by the manager process,
  (2) the specified data set is listed in the data set table, and
  (3) the specified data set is being actively cached by the manager process;

(e) if all of the conditions recited in paragraph (d) are true and the I/O request is a read request, then:
  (1) removing, from the directory of data blocks, one or more entries respectively corresponding to one or more data blocks responsive to the read request, referred to as the requested data blocks;
  (2) attempting to copy the requested data blocks from the cache to the calling process buffer;
  (3) replacing the data entries for the requested data blocks in the directory of data blocks;
  (4) if (i) the manager process is in a simulate mode, or (ii) the attempt to copy the requested data blocks from the cache to the calling process buffer was not successful, then (x) passing control to the read/write routine to copy the requested data blocks from the storage medium to the calling process buffer, (y) when the read/write routine reports completion of the copying, copying the requested data blocks to the cache, and (z) notifying the calling process that processing of the read request is complete;
  (5) if (i) the manager process is not in a simulate mode and (ii) the attempt to copy the requested data blocks from the cache to the calling process was successful, then (x) dispatching a service request block to branch to a termination routine of the calling process and (y) returning control to the calling process;

(f) if all of the conditions recited in paragraph (d) are true and the I/O request is a write request, then:
  (1) removing from the cache one or more data blocks responsive to the write request, referred to as the requested dark blocks;
  (2) copying the requested data blocks from the calling process buffer to the cache;
  (3) replacing the data entries for the requested data blocks in the directory of data blocks;
  (4) testing whether the manager process is in a simulate mode, and if not, then dispatching a service request block to branch to a termination routine of the calling process; and
  (5) returning control to the calling process.

9. A program storage device readable by an MVS computer system and encoding a program of instructions executable by the computer system, wherein said program of instructions includes instructions for performing the operations recited in a specified one of claims 1 through 8.

* * * * *

UNITED STATES PATENT AND TRADEMARK OFFICE
CERTIFICATE OF CORRECTION

PATENT NO. : 5,664,217

DATED : September 2, 1997

INVENTOR(S) : William Russell Cunningham and Michael Laurie Perry

It is certified that error appears in the above-identified patent and that said Letters Patent is hereby corrected as shown below:

In Column 12, line 28, the word "dark" should read --data--.

Signed and Sealed this

Fourth Day of November, 1997

Attest:

BRUCE LEHMAN

Attesting Officer

Commissioner of Patents and Trademarks